United States Patent
Dillon (10) Patent No.: US 10,704,626 B2
(45) Date of Patent: Jul. 7, 2020

(54) SYSTEM AND METHOD FOR PROVIDING DRIVE SHAFT BRAKING FOR IRRIGATION MACHINES

(71) Applicant: Valmont Industries, Inc., Omaha, NE (US)

(72) Inventor: Cory J. Dillon, Bennington, NE (US)

(73) Assignee: Valmont Industries, Inc., Omaha, NE (US)

( * ) Notice: Subject to any disclaimer, the term of this patent is extended or adjusted under 35 U.S.C. 154(b) by 36 days.

(21) Appl. No.: 16/100,161

(22) Filed: Aug. 9, 2018

(65) Prior Publication Data
US 2019/0056001 A1    Feb. 21, 2019

Related U.S. Application Data

(60) Provisional application No. 62/548,294, filed on Aug. 21, 2017.

(51) Int. Cl.
*F16D 63/00* (2006.01)
*F16D 65/06* (2006.01)
(Continued)

(52) U.S. Cl.
CPC ......... *F16D 65/065* (2013.01); *A01G 25/092* (2013.01); *F16D 49/04* (2013.01);
(Continued)

(58) Field of Classification Search
CPC ...... F16D 65/06; F16D 65/065; F16F 15/043; A01G 25/09; A01G 25/092; A01G 25/095; A01G 25/097
(Continued)

(56) References Cited

U.S. PATENT DOCUMENTS 1,723,419 A    8/1929   Hertrich et al.
RE26,285 E *  10/1967   Stafford ................. A01G 25/09
                                                          239/735
(Continued)

OTHER PUBLICATIONS

International Application PCT/US18/46145 International Search Report and Written Opinion dated Jan. 22, 2019, 11 pages.
(Continued)

*Primary Examiner* — Nicholas J Lane
(74) *Attorney, Agent, or Firm* — Milligan PC LLO (57) ABSTRACT

The present invention provides a system and method for providing drive shaft braking for an irrigation machine. According to an exemplary preferred embodiment, the present invention includes a system for providing drive shaft braking during the operation of an irrigation machine where the irrigation machine includes a drive system having a drive motor and a drive shaft. According to a preferred embodiment, the system in accordance with the present invention preferably includes a cam attached to the drive shaft, an extension arm having a first securing point, a securing arm having a second securing point and a spring attached between the first securing point and the second securing point. According to a further preferred embodiment, the system of the present invention preferably further includes a follower mechanism secured to the extension arm, which applies continual frictional pressure to the drive shaft in response to the force applied by the spring to the follower through the extension arm. According to a further preferred embodiment, an exemplary system according to the present invention functions to hold the drive shaft in place when rotational force is not actively applied to the drive shaft by the drive motor.

11 Claims, 7 Drawing Sheets

(51) Int. Cl.
*A01G 25/09* (2006.01)
*F16D 65/00* (2006.01)
*F16D 49/04* (2006.01)
*F16D 127/00* (2012.01)

(52) U.S. Cl.
CPC ......... *F16D 63/00* (2013.01); *F16D 65/0043* (2013.01); *F16D 65/0056* (2013.01); *F16D 65/0087* (2013.01); *F16D 2127/001* (2013.01)

(58) Field of Classification Search
USPC .......................................................... 188/83
See application file for complete search history.

(56) References Cited

U.S. PATENT DOCUMENTS

| | | | |
|---|---|---|---|
| 3,680,665 A | | 8/1972 | Harris |
| 3,680,787 A | * | 8/1972 | Sherman ............... A01G 25/092 239/731 |
| 3,684,178 A | | 8/1972 | Friedlander |
| 3,734,253 A | | 5/1973 | Derossi |
| 3,957,144 A | * | 5/1976 | Opyrchal ................... B66F 3/08 192/223.2 |
| 3,965,924 A | * | 6/1976 | Kennedy ............... A01G 25/092 239/728 |
| 4,059,779 A | | 11/1977 | Wistinghausen |
| 4,093,036 A | * | 6/1978 | Knutson ............... A01G 25/092 180/14.1 |
| 4,114,747 A | * | 9/1978 | Eller ................... B23Q 11/0092 188/83 |
| 4,121,612 A | | 10/1978 | Conrad |
| 4,124,084 A | | 11/1978 | Albright et al. |
| 4,390,161 A | | 6/1983 | Nelson |
| 4,470,490 A | | 9/1984 | Morel |
| 4,579,201 A | | 4/1986 | Tiedeman |
| 4,667,779 A | | 5/1987 | Lang |
| 4,693,425 A | | 9/1987 | Meis et al. |
| 5,054,592 A | | 10/1991 | Tysver |
| 5,862,997 A | * | 1/1999 | Reinke ................ A01G 25/092 180/343 |
| 5,944,148 A | | 8/1999 | Bae et al. |
| 6,352,140 B1 | | 3/2002 | Kuivamüki |
| 6,974,015 B2 | | 12/2005 | Gamache |
| 7,073,638 B2 | | 7/2006 | Daniel |
| 7,114,601 B2 | | 10/2006 | Mayer et al. |
| 7,143,888 B2 | | 12/2006 | Lang |
| 8,215,471 B2 | | 7/2012 | Wasser |
| 8,240,449 B2 | | 8/2012 | Shinagawa et al. |
| 2004/0124061 A1 | | 7/2004 | Schuster |
| 2005/0164822 A1 | | 7/2005 | Daniel |
| 2009/0152057 A1 | | 6/2009 | Yamamoto et al. |
| 2011/0101135 A1 | * | 5/2011 | Korus ................... B62D 55/04 239/723 |
| 2012/0067317 A1 | * | 3/2012 | Towne ................... F02B 75/06 123/192.1 |
| 2016/0053834 A1 | | 2/2016 | Tebay |
| 2018/0231096 A1 | * | 8/2018 | Tsuchiya ............... F16F 15/043 |

OTHER PUBLICATIONS

Zhang et al. "Introduction to Mechanisms" Chapter 6: Cams, Jun. 5, 2017, retrieved from <https://www.cs.cmu.edu/~rapidproto/mechanisms/chpt1.html> 12 pages.

* cited by examiner

SYSTEM AND METHOD FOR PROVIDING DRIVE SHAFT BRAKING FOR IRRIGATION MACHINES

RELATED APPLICATIONS

The present application claims priority to U.S. Provisional Application No. 62/548,294 filed Aug. 21, 2017.

FIELD OF INVENTION

The present invention is related in general to an improved irrigation machine design and, in particular, to an improved system and method for providing drive shaft braking for irrigation machines.

BACKGROUND OF THE INVENTION

Modern field irrigation machines are combinations of drive systems and sprinkler systems. Generally, these systems are divided into two types depending on the type of travel they are designed to execute: center pivot and/or linear.

Regardless of being center pivot or linear, common irrigation machines most often include an overhead sprinkler irrigation system consisting of several segments of pipe (usually galvanized steel or aluminum) joined together and supported by trusses, mounted on wheeled towers with sprinklers positioned along its length. These machines move in a circular pattern (if center pivot) or linear and are fed with water from an outside source (i.e. a well or water line).

Most irrigation systems today are driven by an electric motor mounted within one or more drive towers. For most of these irrigation systems, the terrain needs to be reasonably flat. Recently however, these systems have been become more ruggedized and are increasingly used in undulating country. This advantage has resulted in increased irrigated acreage and water use in some areas. In these environments, however, irrigation systems have an increased tendency to "coast" or slip when then are stopped or slowed on sloped surfaces. This results in unwanted and uncontrolled movement by large spans of machinery. Further, it results in the time-consuming misalignment of irrigation spans.

Various braking methods have been applied to irrigation machinery. For instance, U.S. Pat. No. 7,073,638 teaches an agricultural irrigation system which includes a ball ramp brake set between a drive gear motor and a divider gear box. Similarly, U.S. Pat. No. 8,215,471 teaches a mechanical brake for use as torque blocker in an actuator drive which includes an axial shifting mechanism arranged on an input drive shaft. Still further, U.S. Pat. No. 3,957,144 teaches a continuous roller brake for a mechanical actuator which has a ball element engaging in a circumferential groove. While helpful, none of the prior art systems teach or suggest an irrigation system braking mechanism which prevents an irrigation system from coasting after the system has been shut off or when it is in idle.

Based on the foregoing, the present invention provides a system and method for providing drive shaft braking for an irrigation machine. The present invention overcomes the short comings of the prior art by accomplishing this critical objective.

SUMMARY OF THE DISCLOSURE

To minimize the limitations found in the prior art, and to minimize other limitations that will be apparent upon the reading of the specifications, the preferred embodiment of the present invention provides a system and method for providing drive shaft braking for an irrigation machine.

According to an exemplary preferred embodiment, the present invention includes a system for providing drive shaft braking during the operation of an irrigation machine where the irrigation machine includes a drive system having a drive motor and a drive shaft. According to a preferred embodiment, the system in accordance with the present invention preferably includes a cam attached to the drive shaft, an extension arm having a first securing point, a securing arm having a second securing point and a spring attached between the first securing point and the second securing point. According to a further preferred embodiment, the system of the present invention preferably further includes a follower mechanism secured to the extension arm, which applies continual frictional pressure to the drive shaft in response to the force applied by the spring to the follower through the extension arm. According to a further preferred embodiment, an exemplary system according to the present invention functions to hold the drive shaft in place when rotational force is not actively applied to the drive shaft by the drive motor.

These and other advantages and features of the present invention are described with specificity so as to make the present invention understandable to one of ordinary skill in the art.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention, thus the drawings are generalized in form in the interest of clarity and conciseness. It should be understood that the scope of the present invention is intended to be limited solely by the appended claims.

DETAILED DESCRIPTION OF THE DRAWINGS

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

Figure 1:
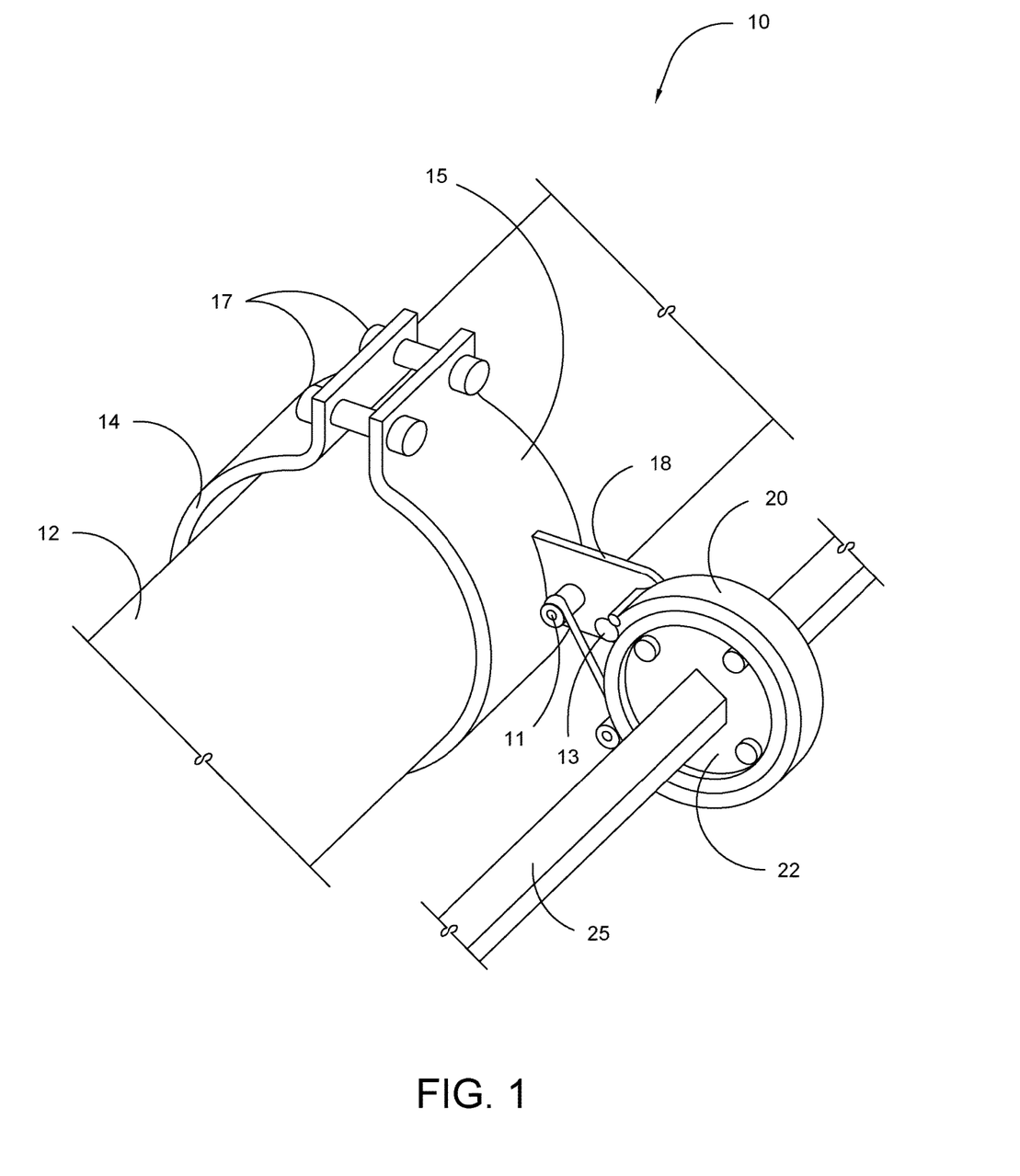
FIG. 1 shows a perspective view of a band brake system in accordance with a first preferred embodiment of the present invention.

With reference now to FIG. 1, a first exemplary brake system 10 in accordance with a first preferred embodiment of the present invention shall now be discussed. As shown in FIG. 1, the first exemplary brake system 10 is preferably attached and secured to a structural member 12 of a wheeled tower. Preferably, the selected structural member 12 runs parallel to the wheeled tower drive shaft 25.

Figure 3:
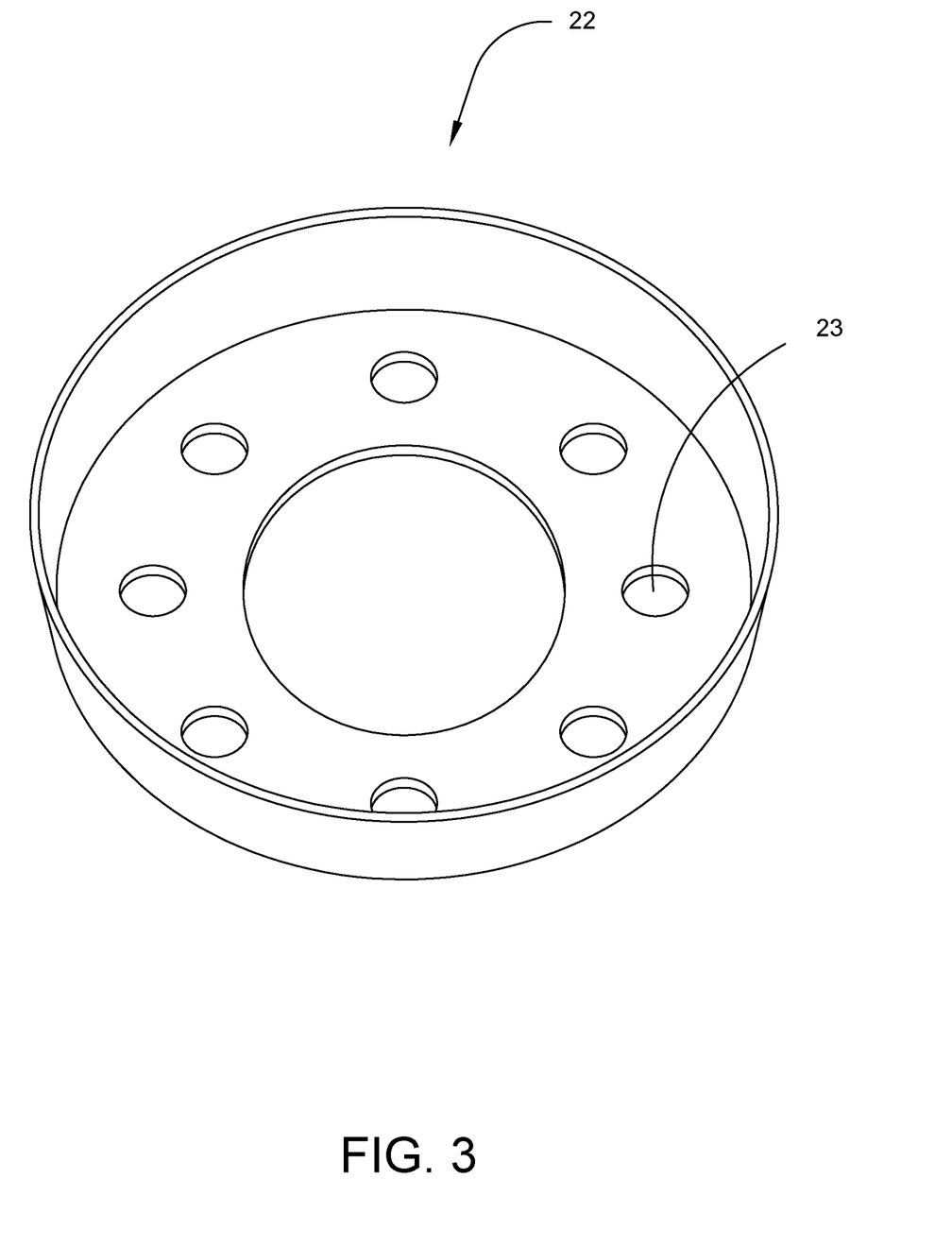
FIG. 3 shows a perspective view of an exemplary hub for use with the first preferred embodiment shown in FIG. 1.

As further shown in FIG. 1, a preferred system of the present invention preferably includes a hub flange 22 which is preferably attached to the drive shaft 25. According to a preferred embodiment, the hub flange 22 may preferably be welded to the drive shaft 25. According to an alternative preferred embodiment, the hub flange 22 may alternatively be secured to the drive shaft 25 in a variety of other ways. For example, with reference to FIG. 3, an exemplary hub flange 22 is shown including a number of mounting holes 23 which may be used with a mounting plate and bolts to secure the hub flange 22 to the drive shaft 25.

As further shown in FIG. 1, the first exemplary brake system 10 may further include an extension arm 18 which includes securing points 11, 13 which preferably extend laterally from the surface of the extension arm 18. According to a further preferred embodiment, the exemplary brake system 10 of the present invention may preferably further include a band brake 20 which connects between securing points 11, 13 and extends around the circumference of the hub flange 22. According to a further preferred embodiment, the extension arm 18 is preferably secured to the structural member 12 via half clamps 14, 15 which may preferably be connected via securing bolts 17 or the like. In operation, the band brake 20 preferably may be tensioned so that a continual frictional force is applied to the flange hub 22. In this way, a continual braking may preferably be applied to the drive shaft 25. According to alternative preferred embodiments, the band brake may be adjustable via a spring and bolt combination.

Figure 2:
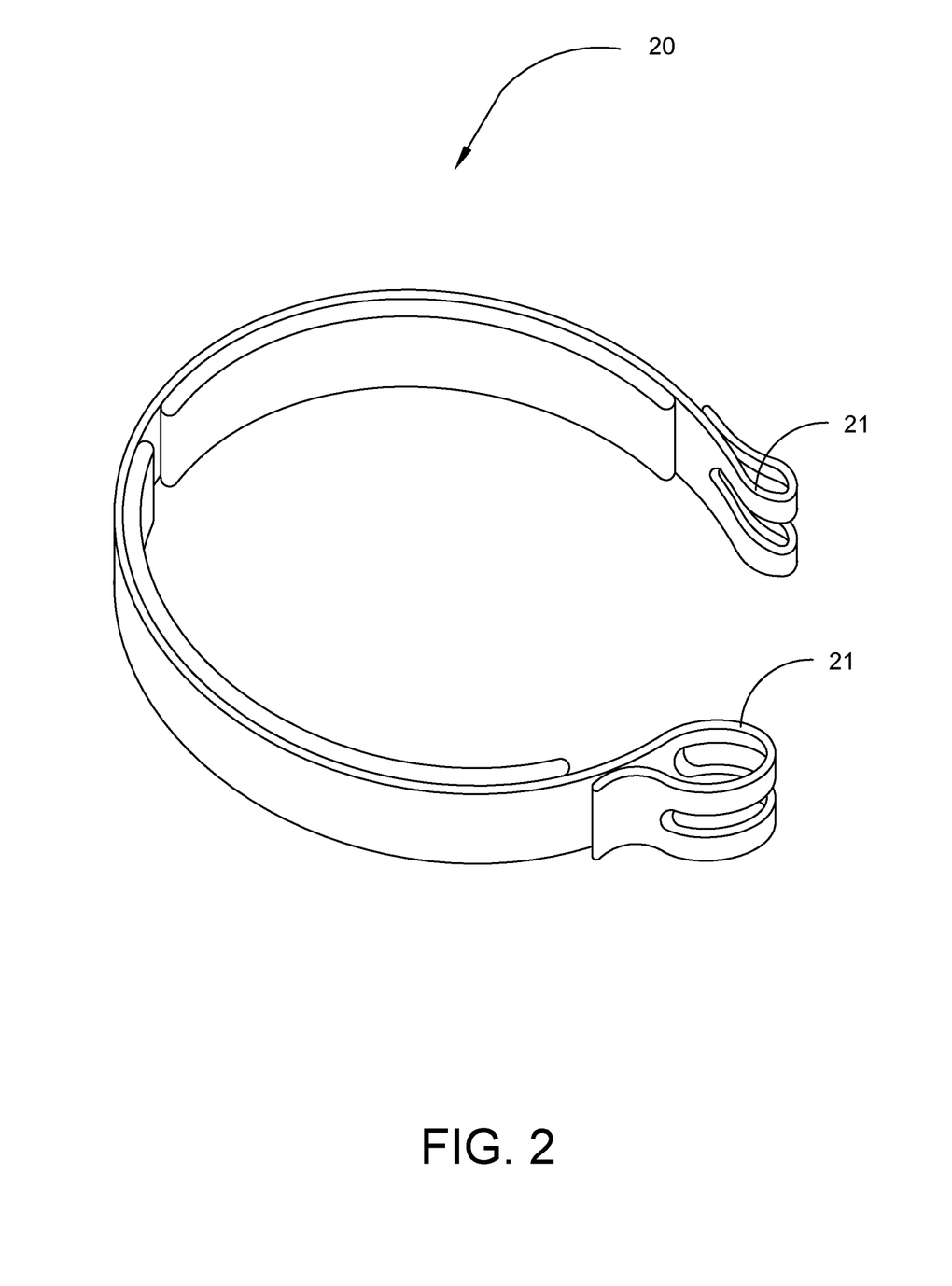
FIG. 2 shows a perspective view of an exemplary band brake for use with the first preferred embodiment shown in FIG. 1.

FIG. 2 shows a perspective view of an exemplary band brake 20 for use with the first preferred embodiment shown in FIG. 1. As shown in FIG. 2, the band brake 20 may preferably be comprised of a band of friction resistant material such carbon braking materials or the like. As further shown in FIG. 2, the exemplary brake band 20 of the present invention may further include attachment points 21 for connecting to securing points 11, 13.

Figure 4:
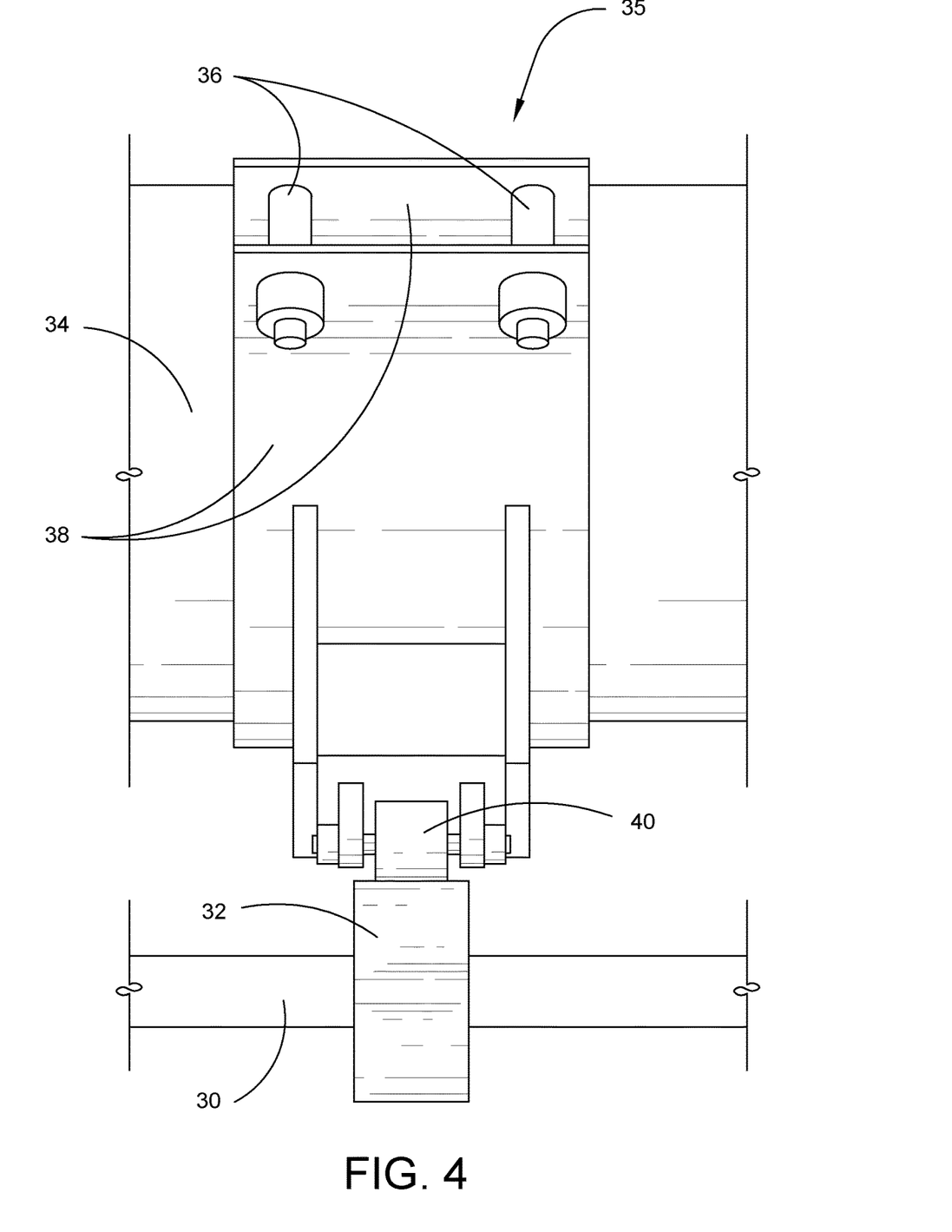
FIG. 4 shows a perspective view of a spring-loaded cam roller brake in accordance with a further preferred embodiment of the present invention.
Figure 5:
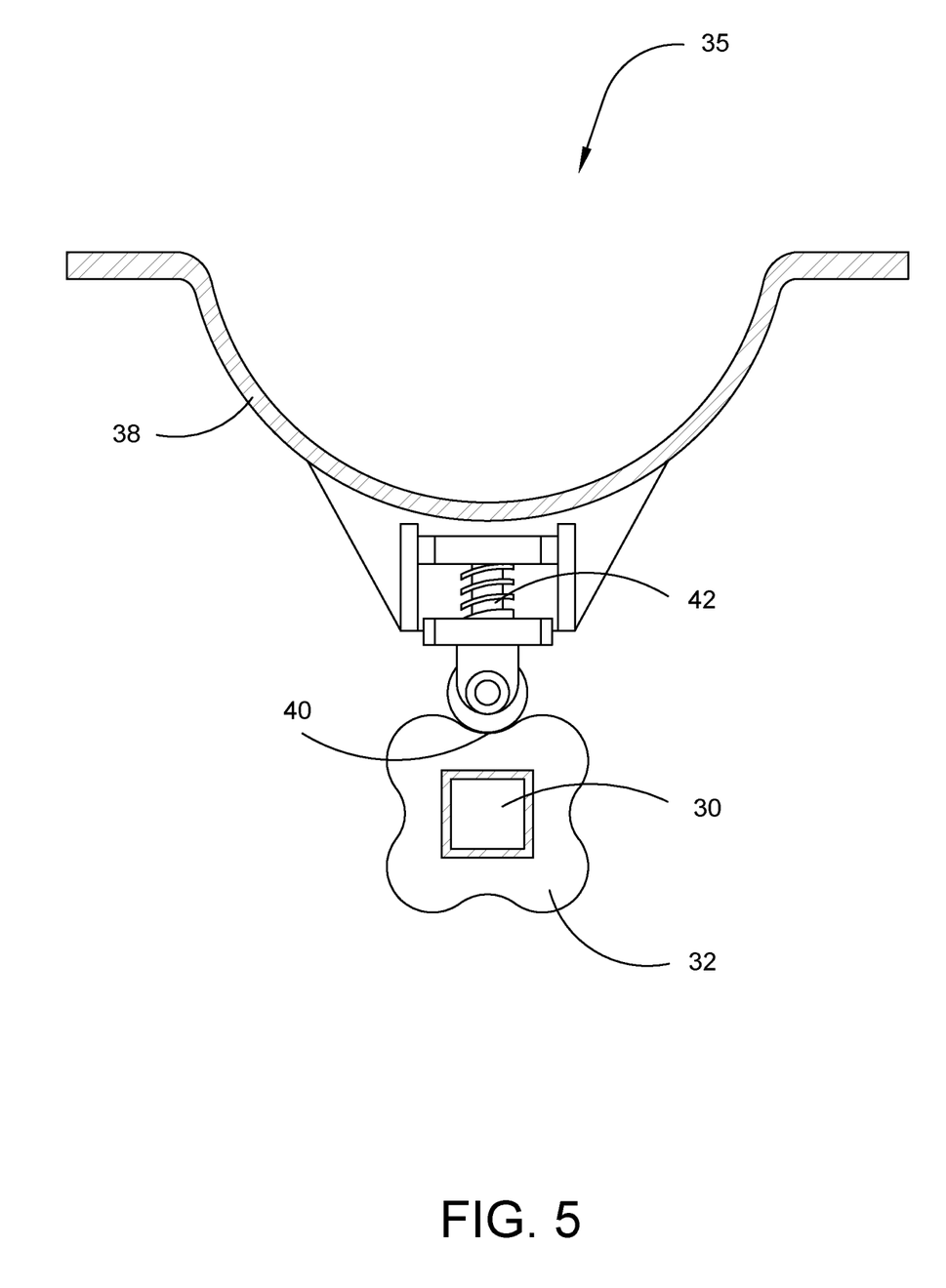
FIG. 5 shows an internal view of the spring-loaded cam roller brake shown in FIG. 4.

With reference now to FIGS. 4-5, an exemplary spring-loaded cam roller brake 35 in accordance with an alternative preferred embodiment of the present invention shall now be discussed. As shown in FIG. 4, the exemplary spring-loaded cam roller brake 35 of the present invention preferably includes a cam 32 secured to a drive shaft 30. As further shown in FIG. 4, the spring-loaded cam roller brake 35 preferably further includes a follower mechanism 40 which is attached to a securing pipe 34 using half clamps 38 and securing bolts 36. As shown in FIG. 5, the follower 40 is preferably projected forward and held into contact with cam 32 by a spring mechanism 42. In this way, the exemplary spring-loaded cam roller brake 35 preferably applies continual frictional pressure to the drive shaft 30 via the spring pressure applied to the follower 40. Accordingly, the drive shaft 30 may be held in place when rotational force is not actively being applied by the drive motor.

Figure 6:
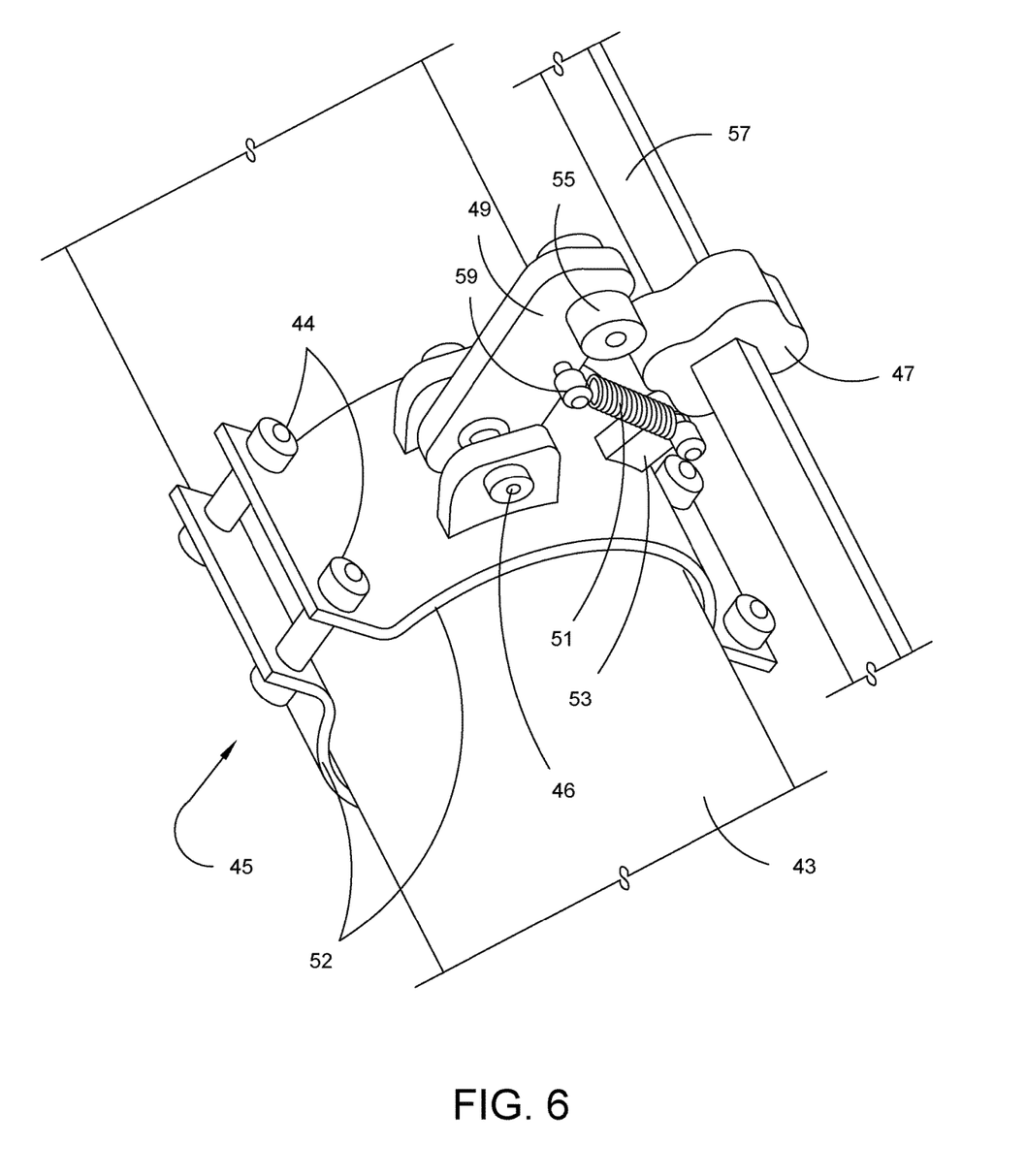
FIG. 6 shows a perspective view of an alternative spring-loaded cam roller brake in accordance with a further preferred embodiment of the present invention.
Figure 7:
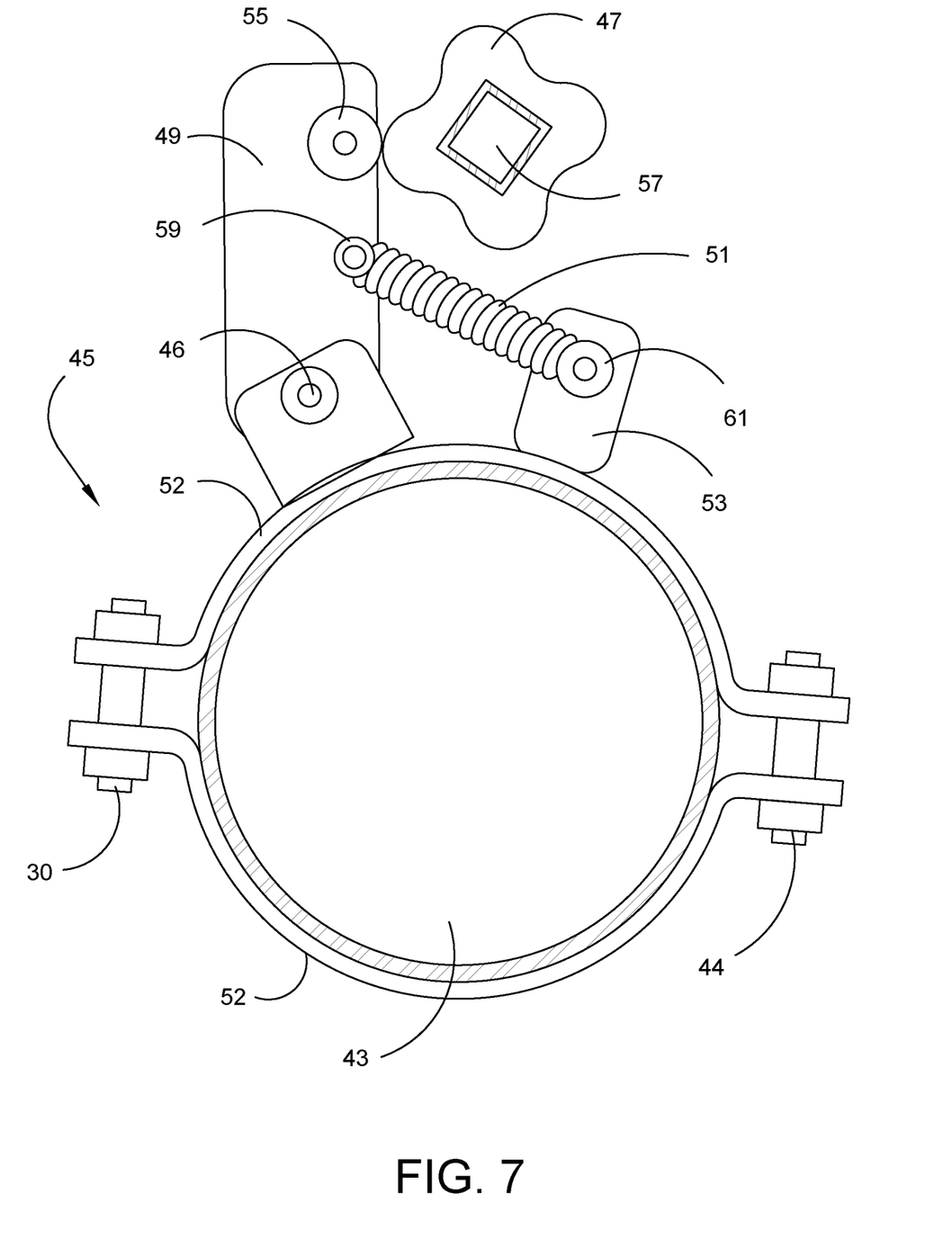
FIG. 7 shows an internal view of the spring-loaded cam roller brake shown in FIG. 6.

With reference now to FIGS. 6-7, an alternative spring-loaded cam roller brake assembly 45 in accordance with a further preferred embodiment of the present invention shall now be discussed. As shown in FIGS. 6-7, the alternative spring-loaded cam roller brake assembly 45 of the present invention preferably includes a cam 47 attached to a drive shaft 57. As further shown, the brake assembly 45 preferably further includes an extension arm 49 and a securing arm 53 which are both secured to a securing pipe 43 via half clamps 52 and securing bolts 44. As still further shown, the brake assembly 45 preferably further includes a spring 51 which is attached between the extension arm 49 (at a first securing point 59) and the securing arm 53 (at a second securing point 61). As further shown, the extension arm 49 preferably further includes a follower 55.

In operation, the follower 55 shown in FIGS. 6-7 is preferably held in contact with the cam 47 by the spring 51. In this way, the exemplary alternative spring-loaded cam roller brake assembly 45 preferably applies continual frictional pressure to the drive shaft 57 via the force of the spring 51 applied to the follower 55 through the extension arm 49 which is preferably rotationally connected via a pivotably connector 46. Accordingly, the drive shaft 57 may be held in place even when rotational force is not actively being applied by the drive motor.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description, but by the claims and the equivalents to the claims appended hereto. The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A system for providing drive shaft braking during the operation of an irrigation machine, wherein the irrigation machine comprises a drive tower structure having a drive tower pipe supporting the drive tower; wherein the irrigation machine further comprises a drive system having a drive motor and a drive shaft; wherein the system comprises:

a cam, wherein the cam is attached to the drive shaft;

an extension arm, wherein the extension arm has a first securing point; further wherein the extension arm is rotatably mounted to the drive tower pipe;

a securing arm, wherein the securing arm has a second securing point; further wherein the securing arm is fixedly secured to the drive tower pipe;

a spring, wherein the spring is attached between the first securing point and the second securing point; and a follower mechanism, wherein the follower mechanism is secured to the extension arm; further wherein the follower mechanism applies frictional pressure to the drive shaft in response to the force applied by the spring to the follower mechanism through the extension arm;

wherein the frictional pressure applied by the drive shaft is sufficient to hold the drive shaft in place when rotational force is not actively applied by the drive motor.

2. The system of claim 1, wherein the cam is a radial cam.

3. The system of claim 2, wherein the cam is selected from a group of cams comprising: cylindrical cams and conjugate cams.

4. The system of claim 2, wherein the follower mechanism is comprised of a roller follower.

5. The system of claim 4, wherein the follower mechanism is selected from a group of follower mechanisms comprising: a flat faced follower, a spherical faced follower, and a knife-edge follower.

6. The system of claim 4, wherein the follower is an in-line follower.

7. The system of claim 4, wherein the follower is an offset follower.

8. The system of claim 7, wherein the follower is a translating follower.

9. The system of claim 7, wherein the follower is a pivoted follower.

10. The system of claim 6, wherein the follower has a pressure angle of zero.

11. The system of claim 6, wherein the extension arm and the securing arm are secured to the drive tower pipe by a half clamp securing mechanism.

* * * * *